(12) United States Patent
Roberson et al.

(10) Patent No.: US 10,534,106 B2
(45) Date of Patent: Jan. 14, 2020

(54) MAGNETIC SURFACE WAVE EFFECT TO PROBE FLUID PROPERTIES IN A WELLBORE

(71) Applicant: Halliburton Energy Services, Inc., Houston, TX (US)

(72) Inventors: Mark W. Roberson, Cary, NC (US); Scott Goodwin, Chapel Hill, NC (US)

(73) Assignee: Halliburton Energy Services, Inc., Houston, TX (US)

( * ) Notice: Subject to any disclaimer, the term of this patent is extended or adjusted under 35 U.S.C. 154(b) by 71 days.

(21) Appl. No.: 15/740,336

(22) PCT Filed: Jul. 29, 2015

(86) PCT No.: PCT/US2015/042630
§ 371 (c)(1),
(2) Date: Dec. 27, 2017

(87) PCT Pub. No.: WO2017/019058
PCT Pub. Date: Feb. 2, 2017

(65) Prior Publication Data
US 2018/0188407 A1     Jul. 5, 2018

(51) Int. Cl.
*G01V 3/30* (2006.01)
*E21B 47/00* (2012.01)
(Continued)

(52) U.S. Cl.
CPC ............ *G01V 3/30* (2013.01); *E21B 47/0005* (2013.01); *E21B 47/12* (2013.01); *G01V 3/38* (2013.01)

(58) Field of Classification Search
CPC . G01V 3/30; G01V 3/28; G01V 15/00; G01V 3/082; G01V 3/26; G01V 11/00; G01V 1/46; G01V 3/32; G01V 1/16; G01V 1/223; G01V 1/52; G01V 3/104; G01V 3/18; G01V 3/38; G01V 5/12; G01V 7/06; E21B 47/12; E21B 17/006; E21B 43/086; E21B 47/16; E21B 49/00; E21B 49/06; E21B 49/081; E21B 49/10; E21B 47/0905; E21B 44/02; E21B 7/06; E21B 47/00;
(Continued)

(56) References Cited

U.S. PATENT DOCUMENTS

| 2010/0017137 A1 | 1/2010 | Legendre et al. |
| 2010/0126717 A1* | 5/2010 | Kuchuk ................ E21B 49/008 166/250.03 |

(Continued)

FOREIGN PATENT DOCUMENTS

| EP | 1717412 B1 | 1/2008 |
| WO | 2012122178 A2 | 9/2012 |

OTHER PUBLICATIONS

International Search Report and Written Opinion dated Apr. 20, 2016, for PCT Application No. PCT/US2015/042630 filed on Jul. 29, 2015.

*Primary Examiner* — Vinh P Nguyen
(74) *Attorney, Agent, or Firm* — Chamberlain Hrdlicka

(57) ABSTRACT

A magnetic signally assembly is described that when placed around a string casing in a wellbore can ascertain properties of the fluid in the annulus surrounding the string casing. Further, methods of using the magnetic signaling assembly to ascertain fluid properties and to indicate the condition of the well are also described.

28 Claims, 3 Drawing Sheets

(51) Int. Cl.
*E21B 47/12* (2012.01)
*G01V 3/38* (2006.01)

(58) Field of Classification Search
CPC ............ E21B 47/022; E21B 47/02216; E21B 47/042; E21B 47/09; E21B 21/08; E21B 33/13; G06K 9/6263; G06K 19/0723; G01N 2021/8883; G01N 21/359; G01N 21/85; G01N 33/24; G01N 24/081; G01N 27/902; G01R 33/028; G01R 33/04; G01R 33/10; G01R 35/00; G01R 35/005
See application file for complete search history.

(56) References Cited

U.S. PATENT DOCUMENTS

| | | |
|---|---|---|
| 2014/0116715 A1 | 5/2014 | Sipila et al. |
| 2014/0266211 A1 | 9/2014 | Smith |
| 2014/0368203 A1 | 12/2014 | Samson et al. |

* cited by examiner

MAGNETIC SURFACE WAVE EFFECT TO PROBE FLUID PROPERTIES IN A WELLBORE

BACKGROUND

Natural resources such as gas, oil, and water residing in a subterranean formation or zone are usually recovered by drilling a wellbore into the subterranean formation while circulating a drilling fluid in the wellbore. After terminating the circulation of the drilling fluid, a string of pipe (e.g., casing) is run in the wellbore. The drilling fluid is then usually circulated downward through the interior of the pipe and upward through the annulus, which is located between the exterior of the pipe and the walls of the wellbore. Next, cementing is typically performed whereby a cement slurry is placed in the annulus and permitted to set into a hard mass (i.e., sheath) to thereby attach the string of pipe to the walls of the wellbore and seal the annulus. During the life of a well, from drilling to exhaustion, understanding the evolution of the materials contained in the annulus provides important information on stability within a wellbore. A variety of sensors, temperature, pressure, pH, etc. are routinely placed around or in the casing string all intended to provide information that can be interpreted and translated into a picture of what is taking place downhole.

Prior attempts to monitor annulus composition have been complex and costly. One method that has been used during drilling is to monitor changes in the composition of the drilling mud. Since the drilling mud picks up drill cuttings from the rock formation it is possible to ascertain changes in the rock formation from the changing composition of the drilling mud. The method includes an acoustic sensor using a Doppler technique. In this technique, the speed of sound of the fluid inside the casing string is measured and the speed of sound of the fluid in the annulus is measured. By comparing the two measurements, the fluid composition in the annulus may be is determined.

A better understanding of the various disclosed system and method embodiments can be obtained when the following detailed description is considered in conjunction with the drawings.

DETAILED DESCRIPTION

Figure 1:
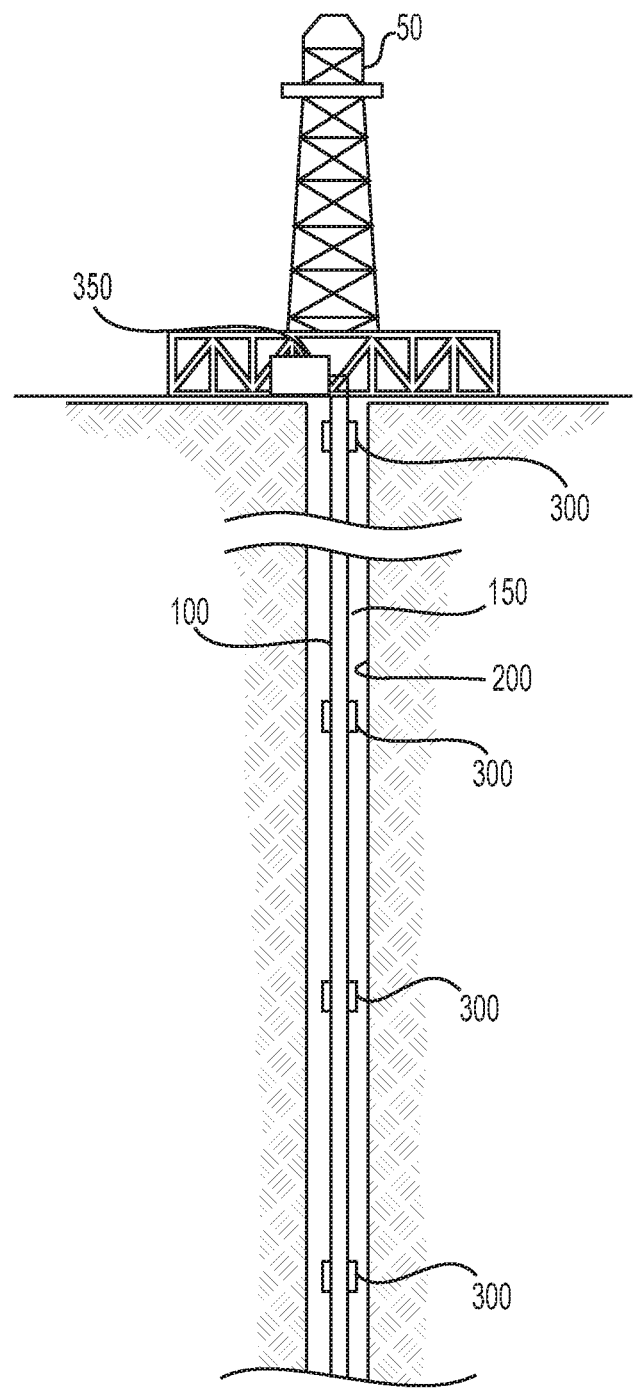
FIG. 1 illustrates one embodiment of an oil rig and wellbore.

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not structure or function.

In the following discussion and in the claims, the terms "including" and "comprising" are used in an open-ended fashion, and thus should be interpreted to mean "including, but not limited to. . . . Unless otherwise specified, use of the terms "up," "upper," "upward," "up-hole," "upstream," or other like terms shall be construed as generally from the formation toward the surface or toward the surface of a body of water; likewise, use of "down," "lower," "downward," "down-hole," "downstream," or other like terms shall be construed as generally into the formation away from the surface or away from the surface of a body of water, regardless of the wellbore orientation. Use of any one or more of the foregoing terms shall not be construed as denoting positions along a perfectly vertical axis.

This disclosure relates to a system for monitoring and understanding the material composition that makes up a subterranean formation. More specifically, this disclosure relates to a wellbore system for monitoring and evaluating the materials that surround a casing string in the annulus between the casing string and the wellbore. This disclosure relates to a magnetic signaling system that uses changes in magnetic field to differentiate material compositions within the wellbore. The system and method as described herein provide information to clarify downhole conditions.

According to one embodiment, a magnetic signaling assembly can be used to study the annulus surrounding the casing string and provide insight into the nature of the surrounding materials/fluids. The magnetic signaling assembly can measure magnetic surface waves i.e., operational frequency of the magnetic field lines over time) between two or more magnetic nodes and from the changes in the magnetic fields, differentiate material compositions surrounding the casing string. The magnetic surface waves are generally affected by the dielectric properties of the fluids and the formation. The magnetic measurement technique is also useful in methods of identifying the fluids/materials of the annulus surrounding the casing string and for monitoring well deterioration or ineffective cementing.

FIG. 1 exemplifies a rig 50 and a wellbore 200. According to the embodiment shown, a casing string 100 extends the length of the wellbore 200. An annulus 150 is created between the casing string 100 and the wellbore 200. Magnetic nodes 300 are placed at spaced locations along the casing string 100 in the wellbore 200. The magnetic nodes 300 may be used to evaluate the environment in the annulus 150.

Magnetic nodes 300 as described can be any suitable magnetic material or assembly capable of generating magnetic surface waves at the desired frequencies. Suitable magnetic materials include permanent magnets or electromagnets or combinations thereof. Magnetic nodes 300 may be made from any art recognized materials including, but not limited to, ferromagnetic materials, ferrimagnetic materials, neodymium iron boron materials, samarium cobalt materials, ceramic materials, alnico materials or combinations thereof. While electromagnets can produce magnetic fields of great intensity, they also require an electrical power supply. By contrast, permanent magnets do not require an electrical power supply and require little to no maintenance. Therefore selection of an appropriate magnetic node structure will be influenced by the particular characteristics of the well in which the assembly will be placed. Among these considerations would be the distance between the nodes which can influence the best frequency to use, which in turn will influence the material selection. According to one embodiment, when using varying fields, for example, an electromagnetic coil may be appropriate.

Figure 2:
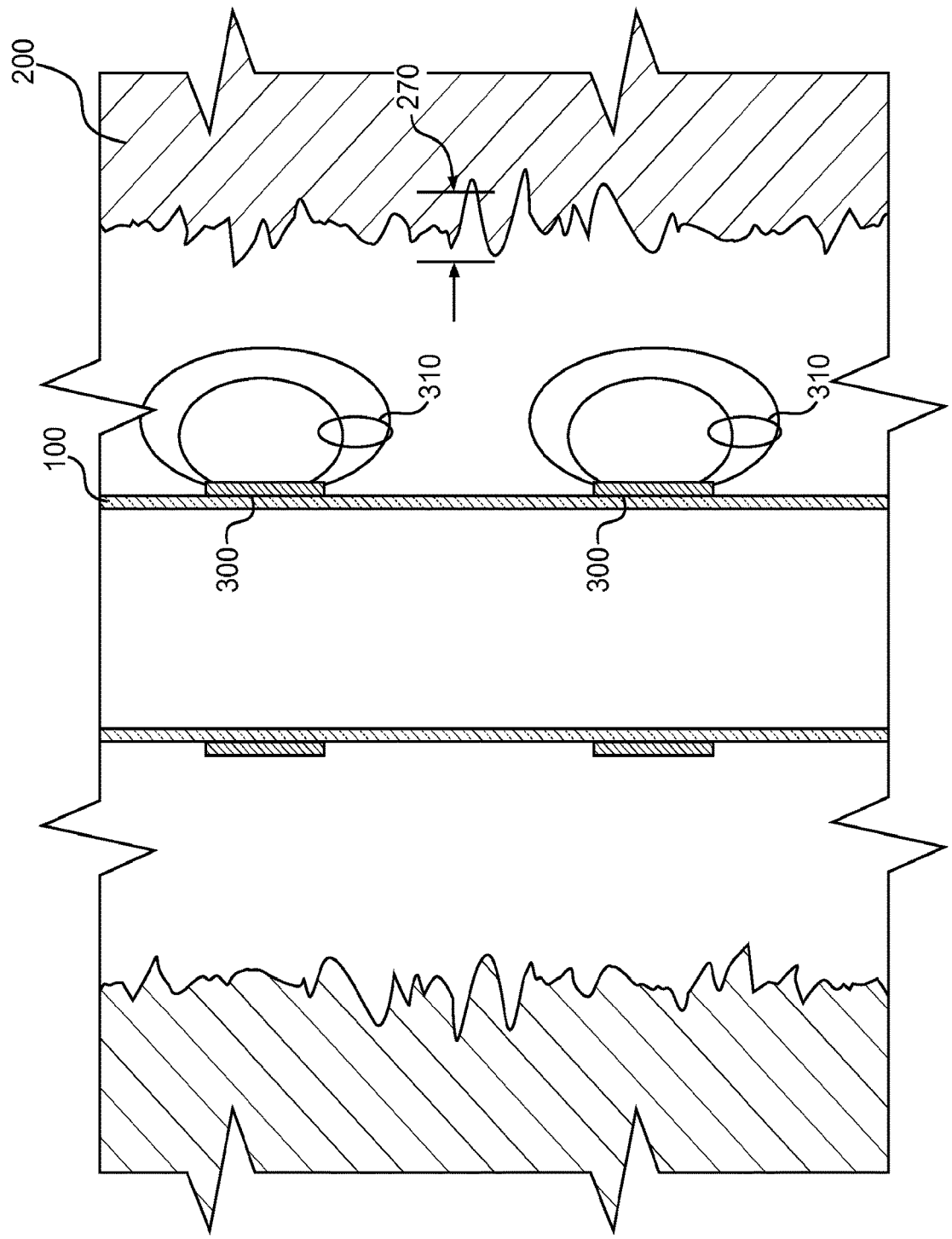
FIG. 2 is a cut away view of a casing string in a wellbore.

With reference to FIG. 2, the casing string 100 and the formation 200 define the annulus 150. Magnetic nodes 300, placed along the casing string 100, are designed to be capable of transmitting magnetic field lines 310 which are received by other magnetic nodes 300. For permanent magnetics, magnetic field lines are continuous and unbroken, forming closed loops. Magnetic field lines are defined to begin on the north pole of a magnet and end on the south pole of the magnetic. The relative strength of the magnetic field 310 transmitted between the nodes 300 is affected by both the material/fluid in the annulus and the formation 200. Differences between the generated and received magnetic waves are indicative of differences in the composition of the material through which the waves passed.

The magnetic nodes 300 may be at spaced intervals along the casing string. The distance between nodes will be impacted by the frequency of the magnetic or electromagnetic field. Generally, the lower the frequency, the closer together the nodes will have to be to maintain the desired signal to noise ratio. The frequency can range from about 1 to 2 Hz up to about 20 MHz, for example from about 1 to 2 Hz to about 2 MHz, for example about 1 KHz to about 100 KHz, for example, about 10 KHz to about 50 KHz. The magnetic nodes can be space from about 1 to about 5 feet apart, up to about 40 feet apart. According to one embodiment, the frequency will be between 50 kHz and 500 kHz at a spacing between 25 and 35 feet.

The mechanism of energy transport through a medium involves the absorption and reemission of wave energy by atoms of the material. When an electromagnetic wave impinges upon the atoms of a material, the energy of that wave is absorbed. The absorption of energy causes the electrons within the atoms to undergo vibrations. After a short period of vibrational motion, the vibrating electrons create a new electromagnetic wave with the same frequency as the first electromagnetic wave. While these vibrations occur for only a very short time, they delay the motion of the wave through the medium. Once an atom reemits the energy of the electromagnetic wave, the wave travels through a small region of space between atoms. Once the wave reaches the next atom, the electromagnetic wave is absorbed, transformed into electron vibrations, and then reemitted as an electromagnetic wave.

The assembly and methods as described herein are predicated on the relationship between the magnetic field, the material through which the magnetic field passes, and the time needed to pass the magnetic field through the material. Several characteristics of the material affect the magnetic field as it passes through. These characteristics cause the surface magnetic waves to change. The altered waves when received b the second magnetic node provide information about the composition through which they passed.

The material/fluid in the annulus has an electrical permittivity, $\epsilon$. Permittivity is the polarizability of the composition or material. More specifically, permittivity is an indication of the material's ability to resist an electric field. An indication of permittivity can be obtained by measuring the relative permittivity $\epsilon_r$. Relative permittivity is a factor by which the magnetic field increases or decreases relative to a vacuum. So, as shown in FIG. 2, the magnetic surface waves 310 are generated by one node 300 and received by another node 300. The received magnetic field pattern can be compared to a standard pattern, i.e., the magnetic field pattern that would exist if the two nodes 300 were contained in a vacuum. The difference between these measurements provides a relative permittivity for the material in the annulus.

The material/fluid in the annulus has a magnetic permeability $\mu$. Magnetic permeability is the measure of the material's ability to support the formation of a magnetic field within itself, i.e., it is the degree of magnetization that a material obtains in response to an applied magnetic field. An indication of a material's magnetic permeability may be obtained by measuring the relative magnetic permeability $\mu_r$. Relative magnetic permeability is the ratio of the permeability of the specific material in the annulus to the permeability of free space (free space being defined by the magnetic constant).

The material/fluid in the annulus has an electrical conductivity, $\sigma$. Electrical conductivity is the measure of the material's ability to conduct an electric current.

As shown in FIG. 2, the magnetic surface waves 310 are generated by one node 300 and received by another node 300. The received magnetic field pattern can be compared to a standard pattern, i.e., the magnetic field pattern that would exist if the two nodes 300 were contained in a vacuum. The difference between these measurements provides an indication of the properties of the material in the annulus. From the relative permittivity, the relative magnetic permeability, and the electrical conductivity data, as a function of frequency, one can generally determine the material(s) that is contained within the annulus.

According to another embodiment, based upon the same relationship, if magnetic nodes 300 are placed along a casing string and the casing string 100 has been cemented into place, the material in the annulus comprises cement and should be stable and unchanging. Thus, for periods during the productive life of the well, the magnetic nodes 300 should generate magnetic surface waves 310 that are at steady state with respect to the frequency response. When a steady state system begins to show changes in the magnetic wave patterns 310, these changes may indicate deterioration of the well or the cement, or other changes that should be addressed.

According to one embodiment as described herein, a magnetic signaling assembly is provided along the outside of the casing string 100 in a wellbore 200. The signaling assembly comprises magnetic nodes 300 that are secured to the casing string at spaced locations. According to one embodiment, the magnetic nodes are secured to each pipe in the casing string as the casing string is assembled. While the system will be described with reference to nodes that are secured to the casing string, any method of placing the nodes in the appropriate position within the wellbore can be used.

Figure 3:
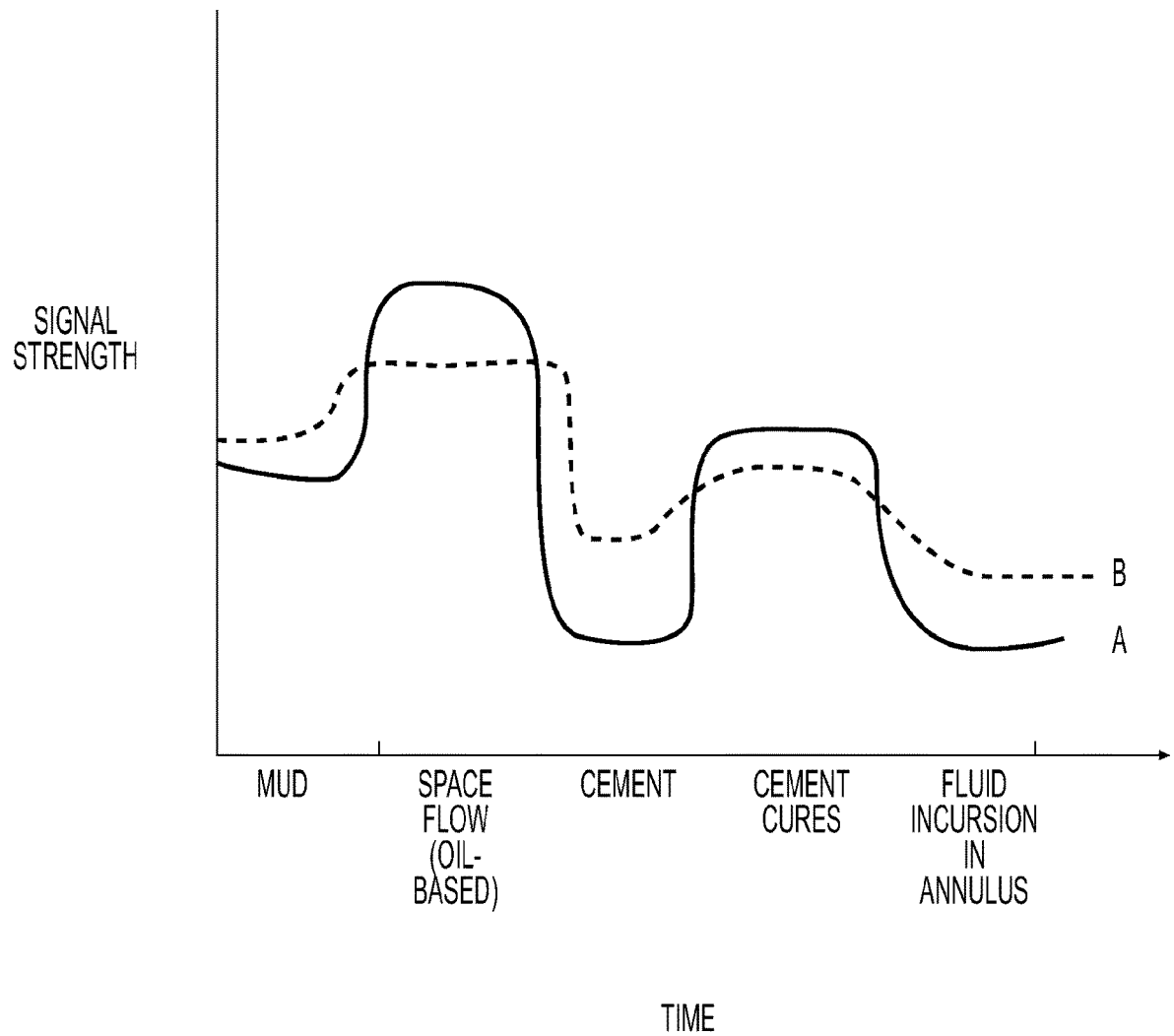
FIG. 3 is a representative curve of the magnetic wave effect at differing times.

In FIG. 3, the relative signal strengths are shown as a function of time schematically. The surface waves move through the annulus and the materials within the annulus until they are picked up by another magnetic node 300. The magnetic surface waves are recorded and the characteristics $\epsilon_r$, $\mu_r$, and $\sigma$ are determined from the signal characteristics as a function of time. Each of the five materials exemplified has a different $\epsilon_r$, $\mu_r$, and $\sigma$ combination and by monitoring the change in received signal, the annulus properties can be determined. Two prophetic signals have been graphed in FIG. 3 on the basis of signal strength as a function of time. The solid line A is a higher frequency signal, while the broken line B represents a lower frequency signal. According to one embodiment, two or more waves of differing frequencies are measured with one or more receiving nodes. According to another embodiment, a single wave is measured using two or more receiving nodes.

According to one embodiment, the pattern of surface waves 310 received by the various magnetic nodes 300 can be collected and inverted by a control system 350, changing them from signals to data that represents the composition in the annulus 150. The control system 350 can include analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified.

The relative received strength from one node to another is affected by the fluid in the annulus 150 and formation's 200 $\epsilon_r$, $\mu_r$, and $\sigma$ properties. When there is a substantial mismatch in $\epsilon_r$, and $\sigma$, a surface wave (quasi-transverse wave) can be excited because of the boundary region 270.

The magnetic nodes 300 can measure and convey information to the surface without storing the information. The magnetic nodes 300 may communicate with the surface of the wellbore in a wired configuration or wirelessly. Likewise, the node 300 can include one or more storage devices that may store and transmit data or that may store and hold data for later reading. Appropriate data storage and communication systems are well understood by the skilled artisan but for example, may include one or more electronic modules including, by way of example, electronic memory, analog or digital outputs and configurable communication tools.

Disclosed herein are methods for detecting or monitoring the condition of a wellbore. According to one embodiment, methods for detecting the composition in the annulus around a casing string in a well bore are described. According to another embodiment, methods of monitoring the integrity and performance of a wellbore over a period in the life of the well are also described.

Compositional characteristics of the materials/fluids contained in the annulus between a wellbore and a casing string are evaluated by a method including, passing magnetic surface waves through the material/fluid to be analyzed, receiving the magnetic surface waves after they have passed through the material to be analyzed, comparing the collected magnetic surface waves to a standard magnetic surface wave that would have been collected if the same magnetic surface wave were passed through a vacuum, generating a signal-based-relative representation of the material, and converting the signal-based-relative representation of the material to a compositional-based-relative representation of the material.

According to one embodiment, the standard magnetic surface wave is developed from the information obtained during a baseline analysis of the well which can occur, for example, during mud circulation prior to cementing of the well. According to another embodiment, the standard magnetic surface wave can be developed or further developed based upon measurements taken from one or more downhole tools that may be used to monitor one or more characteristics of the formation. According to another embodiment, the standard magnetic surface wave may be inferred from the same information.

According to one embodiment, to enhance the life of the well and minimize costs, it is desirable to monitor and/or evaluate the condition of the wellbore so that timely maintenance can be performed and the service life maximized. The integrity of wellbore and the cement can be adversely affected by conditions in the well. For example, cracks in the cement may allow water influx while acid conditions may degrade the cement. According to this embodiment, after cementing of the casing sting in the wellbore, the magnetic surface waves should achieve steady state. According to this method, an operator can monitor the magnetic signaling system to look for any changes in the magnetic surface waves. Changes in the surface waves would be indicative of something happening in the well, for example, a crack in the cement that is allowing water or oil to seep into the annulus. Further, the magnetic surface wave changes may be used to analyze the composition in any areas of failure using methods described herein. Since the changes in magnetic surface waves are predictive of the surrounding composition, appropriate remedial actions can be taken.

In another embodiment, the method may be used for cement/sealant evaluation during placement and curing. As the cement cures, the surface magnetic waves will change as the amount of water in the cement changes. When the cement is fully cured, the surface magnetic waves should be stable. Thus, monitoring the surface magnetic waves will provide an indication of the curing condition of the cement. Likewise, these surface magnetic waves can be used for determining the location of cement or sealant within a wellbore. This is useful, for example, in determining the location of a cement slurry during primary cementing of a wellbore. In this embodiment, the composition and therefore the magnetic surface waves will change when the water or mud or oil is displaced by cement. By knowing which node 300 is detecting cement, it is possible to evaluate the level of cement in the annulus. The same technique can be used to evaluate, for example, the level of other materials within the annulus. Other downstream uses of the disclosed method for determining the composition in a wellbore using variations in magnetic field lines will be readily apparent to the skilled artisan.

As used herein, "about" is meant to account for variations due to experimental error. All numerical measurements are understood to be modified by the word "about", whether or not "about" is explicitly recited, unless specifically stated otherwise. Thus, for example, the statement "a distance of 10 meters," is understood to mean "a distance of about 10 meters."

Although specific embodiments have been illustrated and described herein, it should be appreciated that any arrangement configured to achieve the same purpose may be substituted for the specific embodiments shown. This disclosure is intended to cover any and all adaptations or variations of various embodiments. Combinations of the above embodiments, and other embodiments not described herein, will be apparent to those of skill in the art upon reviewing the above description.

What is claimed:

1. A well system for use in a wellbore, comprising:
   a casing string located in the wellbore;
   magnetic nodes capable of generating magnetic waves and receiving received surface magnetic waves that have passed through a material located in an annulus between the casing string and the wellbore; and
   a control system configured to:
     receive a signal representing the surface magnetic wave pattern of the received surface magnetic waves; and compare the surface magnetic wave pattern to known patterns to ascertain the material.

2. The well system of claim 1, wherein the surface magnetic wave pattern represents one or more of the $\epsilon_r$, $\mu_r$, and $\sigma$ of the material through which the waves passed.

3. The well system of claim 1, wherein the magnetic node is configured to generate the magnetic surface wave at a frequency of from about 1 Hz to about 20 MHz.

4. The well system of claim 1, wherein the control system is configured to receive the signal representing the surface wave pattern and a computer configured to compare the magnetic wave patterns.

5. The well system of claim 1, wherein the control system is located outside of the wellbore.

6. The well system of claim 1, wherein the magnetic odes comprise permanent magnets.

7. The well system of claim 1, wherein the magnetic nodes comprise electromagnets.

8. The well system of claim 6, wherein the magnetic nodes are spaced between about 1 and about 40 feet along the casing string.

9. The well system of claim 8, wherein the magnetic nodes are configured to generate the magnetic surface wave at a frequency of from about 1 Hz to about 20 MHz.

10. A method for determining the character of a material in an annulus between a casing string and a wellbore, the method comprising:
generating magnetic surface waves with a known magnetic field pattern;
passing the magnetic surface waves through a material in the annulus;
receiving received magnetic surface waves as affected by the material in the annulus;
calculating a relative permittivity for the material in the annulus by comparing the received magnetic surface waves with the known magnetic field pattern; and
correlating the relative permittivity as measured with the character of a material in the annulus.

11. The method of claim 10, wherein the surface waves are generated at a frequency of from about 1 Hz to about 20 MHz.

12. The method of claim 10, further comprising, calculating a relative magnetic permeability of the material in the annulus and correlating the magnetic permeability with the character of the material in the annulus.

13. The method of claim 10, further comprising, calculating a conductivity of the material in the annulus and correlating the conductivity with the character of the material in the annulus.

14. The method of claim 10, wherein the surface waves are received by a magnetic node placed in the annulus.

15. The method of claim 14, wherein the magnetic surface waves received by the magnetic node represent a cement or sealant and the level of cement can be determined based upon the placement of the magnetic node in the annulus.

16. A method of monitoring the curing of a sealant material in an annulus between a casing string and a wellbore, the method comprising:
generating magnetic surface waves;
passing the magnetic surface waves through the sealant material the annulus;
receiving received magnetic surface waves;
monitoring the received magnetic surface waves until the received magnetic surface waves reach a steady state; and
correlating the steady state of the surface waves with the curing of the sealant material.

17. The method of claim 16, wherein the sealant material is cement.

18. A method of monitoring the condition of a sealant in a wellbore between a casing string and the wellbore, the method comprising:
ascertaining a steady state magnetic surface wave pattern that represents a steady state for the wellbore;
passing a magnetic surface wave through the sealant to generate a sealant magnetic surface wave pattern;
comparing the sealant magnetic surface wave pattern with the steady state magnetic surface wave pattern; and
correlating changes in the magnetic surface wave pattern to determine the condition of the sealant.

19. The method of claim 18, further comprising ascertaining the magnetic surface wave pattern using a magnetic signaling assembly comprising multiple magnetic nodes spaced along the casing string.

20. The method of claim 19, wherein the nodes are permanent magnets and the surface wave is continuously passed through the sealant.

21. The method of claim 19, wherein the surface magnetic wave pattern represents one or more of the $\epsilon_r$, $\mu_r$, and $\sigma$ of the sealant material through which the waves passed.

22. The method of claim 18, wherein the magnetic surface wave is generated at a frequency of from about 1 Hz to about 20 MHz.

23. A system for detecting a composition in an annulus of a wellbore, comprising:
at least two magnetic nodes capable of generating magnetic waves and receiving received surface magnetic waves that have passed through the composition; and
a control system configured to:
receive a signal representing the surface magnetic wave pattern of the received surface magnetic waves; and
compare the surface magnetic wave pattern to known patterns to ascertain the composition in the annulus of the wellbore.

24. The detection system of claim 23, wherein the surface magnetic wave pattern represents one or more of the $\epsilon_r$, $\mu_r$, and $\sigma$ of the material through which the waves passed.

25. The detection system of claim 23, wherein the at least two magnetic nodes are configured to generate the magnetic surface wave at a frequency of from about 1 Hz to about 20 MHz.

26. The well system of claim 23, wherein the control system is configured to receive the signal representing the surface wave pattern and a computer configured to compare the magnetic wave patterns.

27. The well system of claim 23, wherein the magnetic nodes comprise permanent magnets.

28. The well system of claim 23, wherein the magnetic nodes comprise electromagnets.

* * * * *

UNITED STATES PATENT AND TRADEMARK OFFICE
CERTIFICATE OF CORRECTION

PATENT NO. : 10,534,106 B2
APPLICATION NO. : 15/740336
DATED : January 14, 2020
INVENTOR(S) : Mark W. Roberson et al.

It is certified that error appears in the above-identified patent and that said Letters Patent is hereby corrected as shown below:

In Claim No. 6, Line 1, "The well system of claim 1, wherein the magnetic odes comprise permanent magnets." should read -- "The well system of claim 1, wherein the magnetic nodes comprise permanent magnets." --

Signed and Sealed this
Seventh Day of April, 2020

Andrei Iancu
*Director of the United States Patent and Trademark Office*